United States Patent
Paumen et al.

(10) Patent No.: US 6,584,967 B1
(45) Date of Patent: Jul. 1, 2003

(54) PORTABLE COOKING APPARATUS AND METHODS OF USE THEREOF

(76) Inventors: Stephen P. Paumen, P.O. Box 503, Maple Lake, MN (US) 55358; Robert J. Borell, 3495 Eldridge Ave. NW., Maple Lake, MN (US) 55358; SueAnne M. Borell, 3495 Eldridge Ave. NW., Maple Lake, MN (US) 55358

( * ) Notice: Subject to any disclaimer, the term of this patent is extended or adjusted under 35 U.S.C. 154(b) by 0 days.

(21) Appl. No.: 10/164,925

(22) Filed: Jun. 6, 2002

(51) Int. Cl.$^7$ ................................................. F24B 3/00
(52) U.S. Cl. ..................... 126/30; 126/25 AA; 126/9 R; 248/156; 248/125.7
(58) Field of Search .............................. 126/9 R, 25 R, 126/25 A, 29, 30, 25 AA; 248/125.7, 124, 156, 125.1; D7/332, 336; 403/373, DIG. 9

(56) References Cited

U.S. PATENT DOCUMENTS

| | | | | |
|---|---|---|---|---|
| 3,344,780 A | * | 10/1967 | Anderson | 126/30 |
| 4,083,354 A | | 4/1978 | Claire et al. | 126/30 |
| 4,094,296 A | | 6/1978 | Beagley | 126/30 |
| 4,230,089 A | * | 10/1980 | Barden | 126/30 |
| 4,351,312 A | * | 9/1982 | Ivy | 126/30 |
| 4,829,977 A | * | 5/1989 | Valentine | 126/30 |
| 4,854,297 A | | 8/1989 | Shuman | 126/30 |
| 4,856,423 A | | 8/1989 | Burns | 99/421 |
| 4,979,490 A | | 12/1990 | Nudo et al. | 126/30 |
| 5,117,806 A | | 6/1992 | Soat | 126/29 |
| 5,297,534 A | | 3/1994 | Louden | 126/30 |
| 5,307,797 A | | 5/1994 | Kleefeld | 126/30 |
| 5,666,940 A | | 9/1997 | Kreiter | 126/30 |
| 5,819,718 A | | 10/1998 | Leiser | 126/30 |
| 5,848,584 A | | 12/1998 | Brog | 126/30 |
| 5,862,742 A | | 1/1999 | Bjerg | 99/449 |
| 5,944,008 A | | 8/1999 | Winkel | 126/25 |
| 5,944,009 A | | 8/1999 | Scheller | 126/30 |
| 6,070,571 A | | 6/2000 | Bradbury | 126/30 |
| 6,105,569 A | | 8/2000 | Andress | 126/30 |
| 6,186,137 B1 | | 2/2001 | Lewis | 126/30 |

FOREIGN PATENT DOCUMENTS

| | | | | |
|---|---|---|---|---|
| CH | 343997 | * | 2/1960 | 126/30 |
| FR | 2606988 | * | 5/1988 | 126/30 |

OTHER PUBLICATIONS

Exhibit A: 2001 Portable grill.

* cited by examiner

Primary Examiner—James C. Yeung
(74) Attorney, Agent, or Firm—Patterson, Thuente, Skaar & Christensen, P.A.

(57) ABSTRACT

An apparatus for use as a cooking aid. The apparatus includes a bar, an arm, and a holder. A preferred embodiment of the apparatus has a holder that includes a biased member operably coupled to the holder. The biased member is shiftable between a resting position and a moving position. The biased member exerts a bias against the bar in the resting position and allows movement of the bar in the moving position.

20 Claims, 5 Drawing Sheets

PORTABLE COOKING APPARATUS AND METHODS OF USE THEREOF

FIELD OF USE

The invention is related to a cooking apparatus, especially an apparatus for use in the field, for example, over an open fire.

BACKGROUND

Cooking over an open flame creates a hazard and inconvenience for the cook. Turning the food over or taking it off or on the grill may sometimes involve reaching into the fire or being exposed to the smoke from the fire. These problems may be addressed by using a cooking apparatus having a grill on an arm that the cook may swing in or out of the fire.

The arm on such a grill, however, must be adjusted to have an optimal height. Some foods require a closer proximity to the fire than others so the height of the grill must be adjusted before or during meal preparations. Moreover, the heat of the fire may change with time as fuel is added and burns away. Thus, an arm that is readily adjustable is needed.

SUMMARY OF THE INVENTION

The present invention has certain embodiments that address these problems. The arm may be placed in a holder that is easily secured to a bar and adjusted to move the arm up or down on the bar relative to a fire. The holder requires no tools or extra parts to be moved; instead, it may be conveniently grasped and moved to a new position that is stable and securely holds the arm. The holder has a biasing member that exerts a force against the bar to secure the arm's position on the bar. A user may counteract the force to allow the holder to be moved on the bar.

An embodiment of the invention includes an apparatus having a bar, a holder, and an arm. The bar has a central axis passing through its first end and its opposing second end. The holder is joined to the bar and the arm. The bar and the arm are preferably disposed orthogonally to each other. The holder has a biased member operably coupled to the holder that is shiftable between a resting position and a moving position. And the biased member has an opening that receives the bar, so that the biased member is biased against the bar and binds the bar in the resting position to prevent movement of the arm parallel to the central axis. The biased member allows movement of the bar in a direction parallel to the central axis when the bias is countered to shift the biased member to the moving position.

An embodiment of the invention is a kit for a cooking apparatus. The kit has a bar, a holder, and an arm. The bar has a central axis passing through a first end and an opposing second end. The holder may be joined to the bar and to an arm. The holder includes a resilient biased member operably joinable to the holder to be shiftable between a resting position and a moving position. The biased member has an opening for receiving the bar. The biased member is disposable on the bar so that, in a resting position, it can exert a force against the bar to bind the bar in the resting position to prevent movement of the arm parallel to the central axis of the bar. The biased member allows movement of the bar in a direction parallel to the central axis when the bias is countered to shift the biased member to the moving position. The kit may have instructions for assembly of the bar, arm, and holder.

Another embodiment of the invention is a method for assembling a cooking apparatus. One step is to procure a bar having a central axis passing through a first end and an opposing second end of the bar. An arm is also procured. Also procured is a holder that has a biased member operably coupled to the holder that is shiftable between a resting position and a moving position. The biased member has a first opening that receives the bar and a second opening that receives the arm. A user performs the steps of: passing the bar through an opening in the arm so that the bar and the arm are approximately perpendicular; passing the arm through the second opening in the holder; passing the bar through the first opening in the holder with the biased member in the moving position; and returning the biased member to the resting position wherein the biased member exerts a bias force against the bar to bind the to prevent movement of the arm parallel to the central axis.

DETAILED DESCRIPTION OF THE PREFERRED EMBODIMENTS

Figure 1:
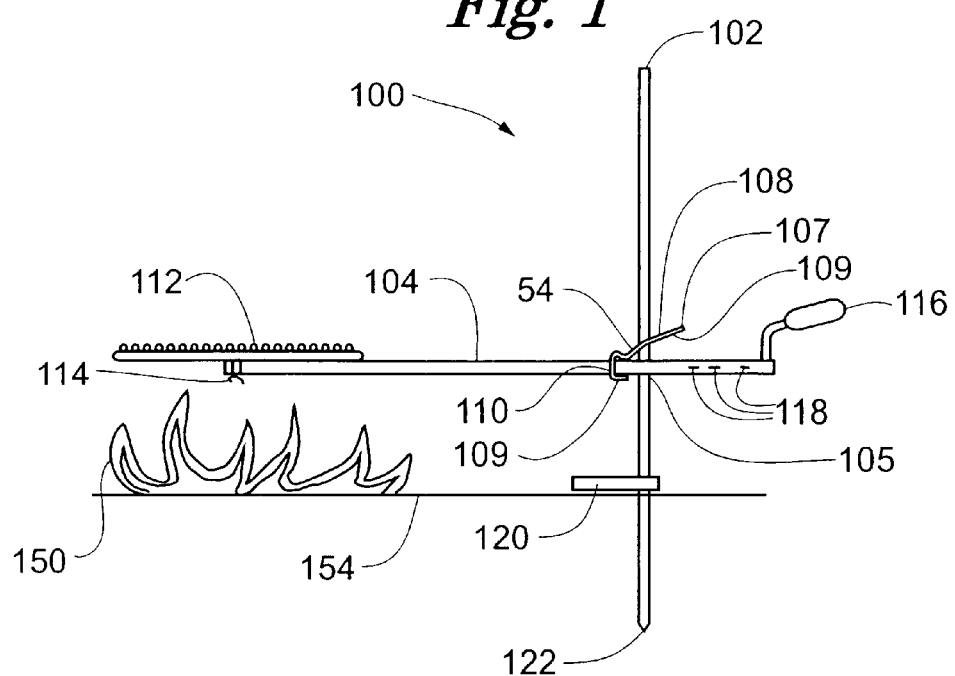
FIG. 1 depicts an elevated view of an embodiment of the invention positioned in the ground.
Figure 2:
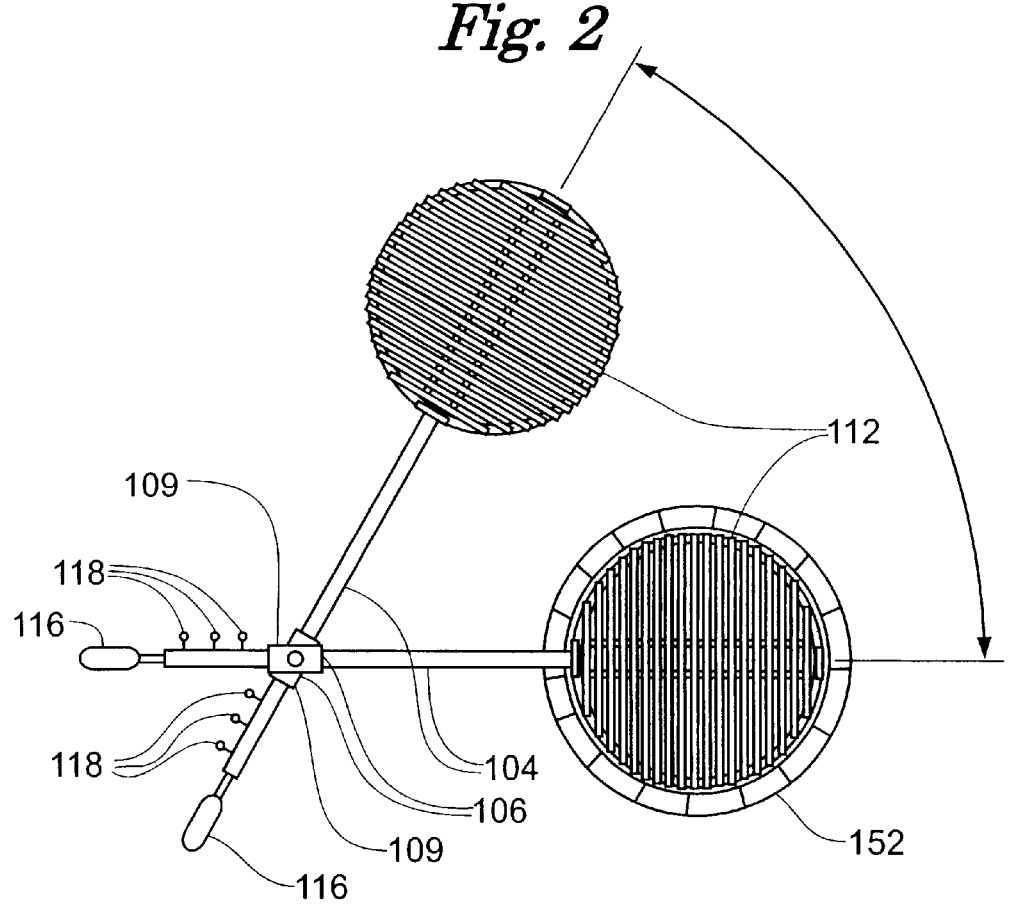
FIG. 2 depicts a plan view of the embodiment of FIG. 1 in position over a fire pit and positioned away from the fire pit.
Figure 3A:
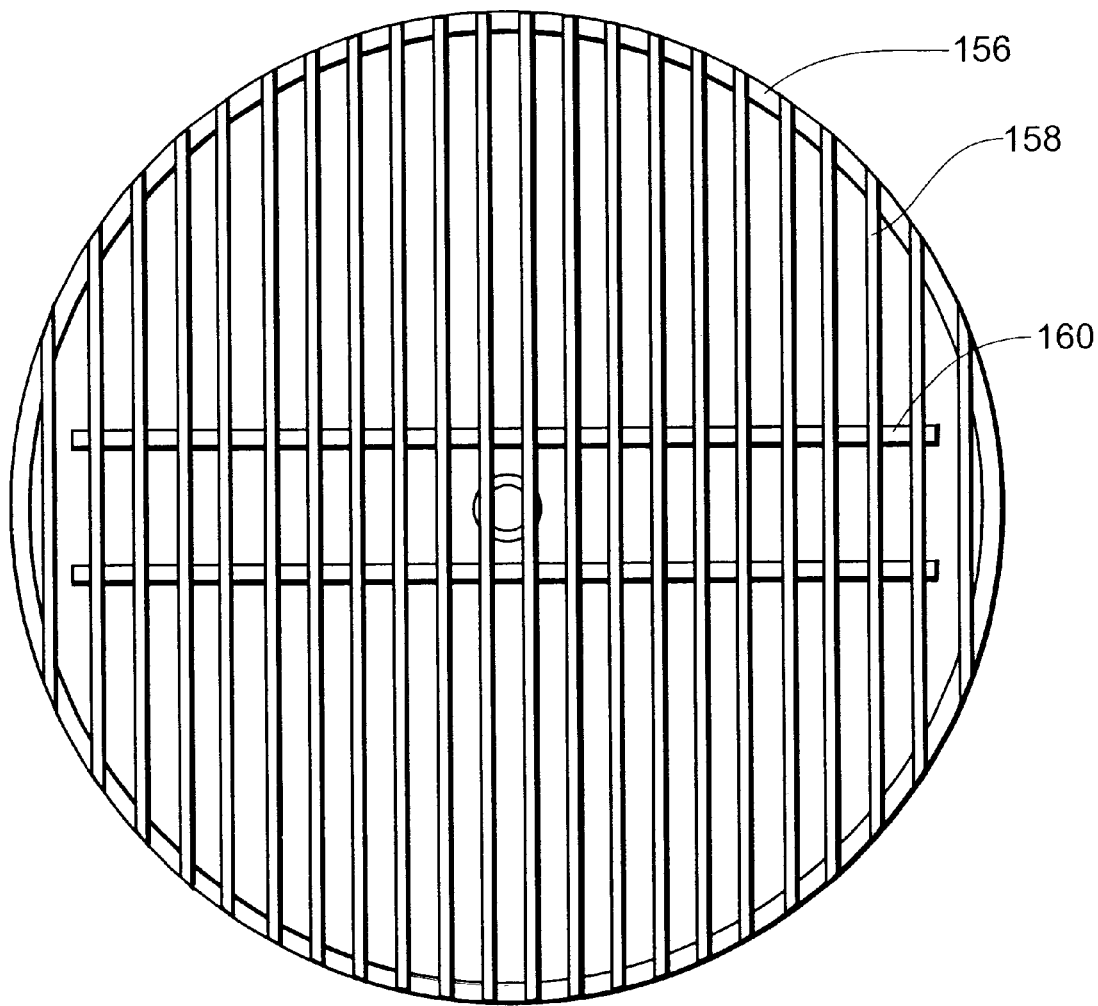
FIG. 3A depicts a plan view of an embodiment of a grill that may be used with the invention.
Figure 3B:
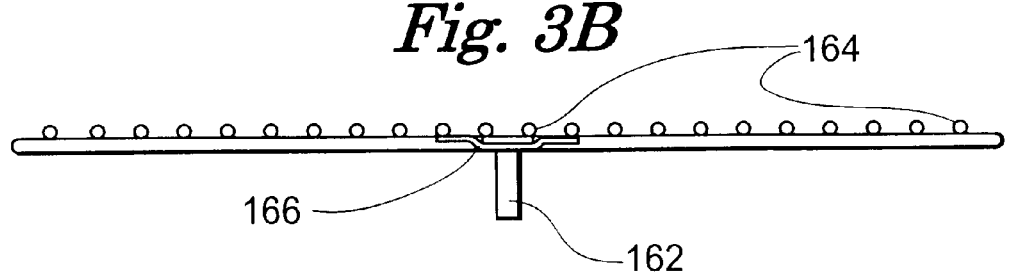
FIG. 3B depicts an elevated view of the embodiment of FIG. 3A.
Figure 4A:
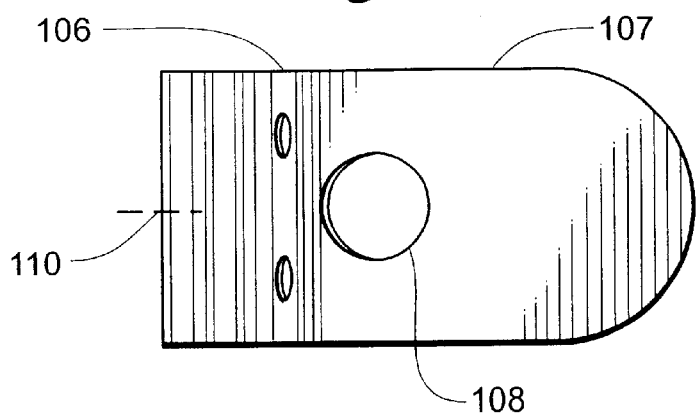
FIG. 4A depicts a plan view of an embodiment of a holder.
Figure 4B:
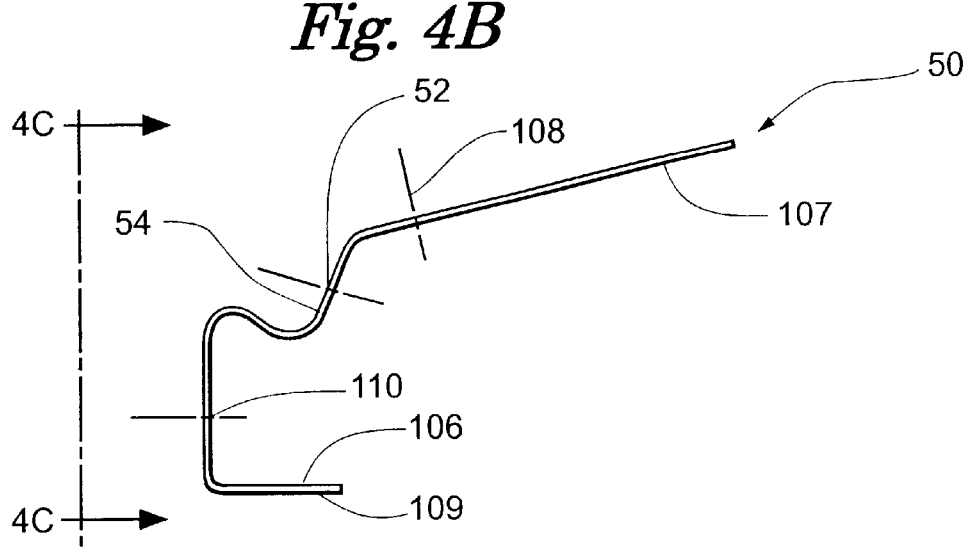
FIG. 4B depicts an elevated view of the embodiment of FIG. 4A.
Figure 4C:
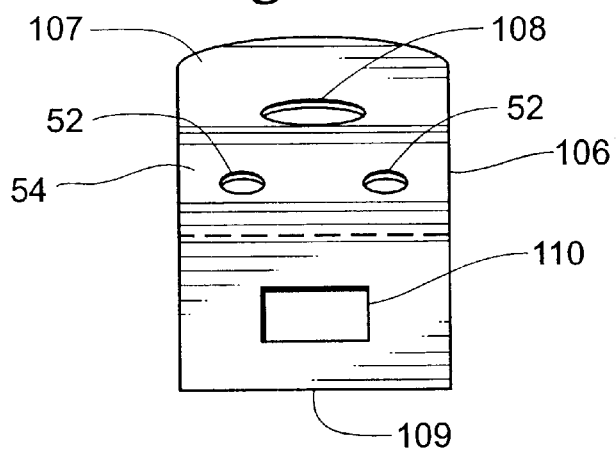
FIG. 4C depicts a view of the holder of FIG. 4B as viewed from the perspective of line 4C–4C'.
Figure 5:
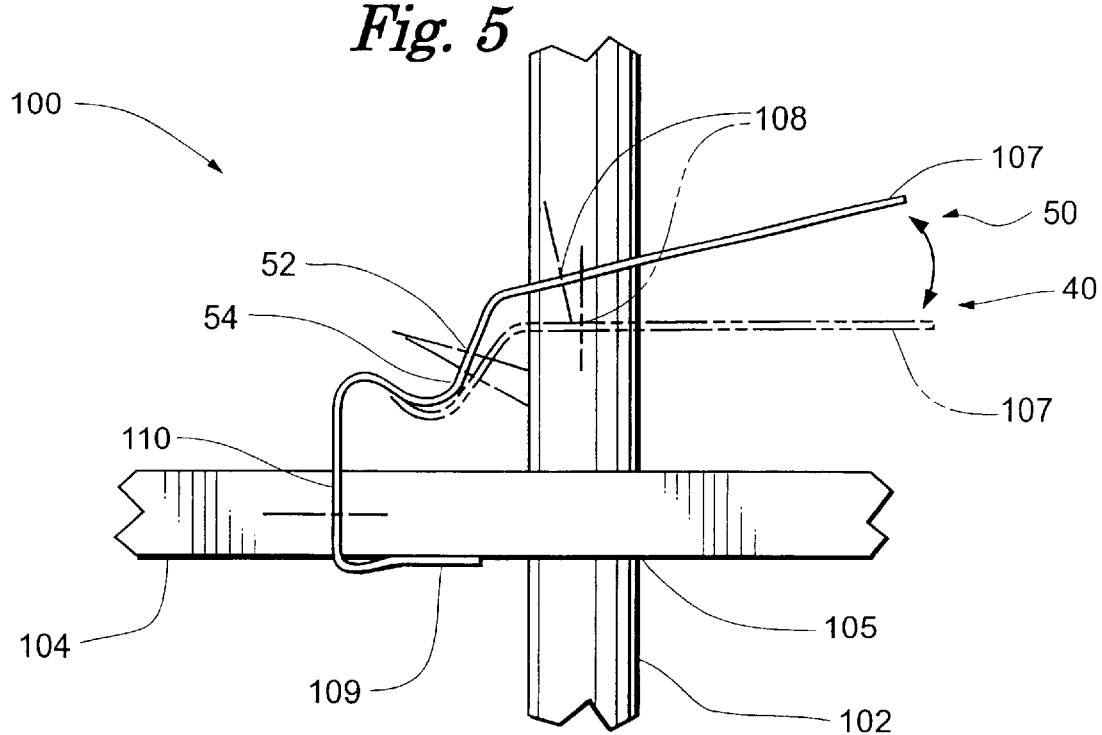
FIG. 5 depicts a fragmentary elevated view of the embodiment of FIGS. 1–4C, depicting the holder in a resting position and a moving position.

An embodiment of the invention is an apparatus for cooking over an open fire. Preferred embodiments may have a bar that is implantable in a base or in the ground and an arm that is held approximately perpendicular to the bar. A holder joined to the bar and the arm has a biased member that holds the arm in place on the bar until shifted to another position that allows the arm to be moved along the length of the bar. The arm holds a grill that can be placed over the fire. The arm can pivot or the whole apparatus may be rotated to swing the grill into and out of the fire.

Referring to FIGS. 1–5, an embodiment of the invention is apparatus 100 with bar 102, arm 104, and holder 106. Holder 106 has opening 110 for arm 104; bias portion 107 with opening 108 for bar 102; arcuate portion 54 having openings 52; gripping portion 109; and is shiftable from a resting position 50 to a moving position 40. Arm 104 has opening 105 and is fastenable to grill 112 using grill opening 114 and has optional hooks 118 and handle 116. Grill 112 has shaft connector 166 connected to shaft 162 for engaging opening 114. Grill ring 158 supports grill rods 156, which are at least partially supported by grill cross-member 160.

Welds 164 secure certain members of grill 112 in place. Bar 102 has pointed end 122 and foot stop 120.

Again referring to FIGS. 1–5, when assembled for use, bar 102 is slid into opening 108 of holder 106 and through opening 105 of arm 104. Arm 104 is passed through opening 110 of holder 106. Holder 106 thereby holds and positionally secures bar 102. When secured in a resting position, bias portion 107 is tensioned to exert a force against bar 102. A user may thus assemble apparatus 100 by passing arm 104 through opening 110 in holder 106 and moving the holder 106 until opening 108 is coaxial, or at least generally aligned, with opening 105 in arm 104. Then bar 102 is passed through openings 105, 108 while bias portion 107 is in moving position 40. Grill 112 is fastened to arm 104 by engaging opening 114 with shaft 162.

Openings 108, 110 of holder 106 are approximately perpendicular to each other when the holder is in moving position 40. Holder 106 also has openings 52 to allow for greater ease of manufacturing and use. Holder 106 further has arcuate portion 54.

Holder 106 also has gripping portion 109 for gripping arm 104. Arm 104 has opening 105 that penetrates through the thickness of arm 104. The edges of opening 105 may be dimensioned so the edges of opening 105 help to maintain bar 102 approximately perpendicular to arm 104 in either of the resting or moving positions.

The holder preferably has edges that cut into the bar so as to better secure the holder. Cutting action may be achieved by the presence of sharp edges or by a metal that is harder that the surface of the bar. For example, the bar may be coated with a material, e.g., paint, that is soft relative to the material of the edges of the holder.

In use, a user forces the bar's pointed end 122 into ground 154, e.g., using foot stop 120. Arm 104 is adjusted relative to ground 154, firepit 152, or flame 150. Food is placed on grill 112 and arm 104 is rotated so that grill 112 is positioned over fire pit 152 for cooking. Grill 112 may be moved to and from firepit 152 as needed. The arm may be pivoted relative to the bar or the bar may be pivoted about its own axis. A user adjusts the position of the arm on the bar by applying a counteracting force to bias portion 107 to move it from resting position 50 to moving position 40.

Figure 6:
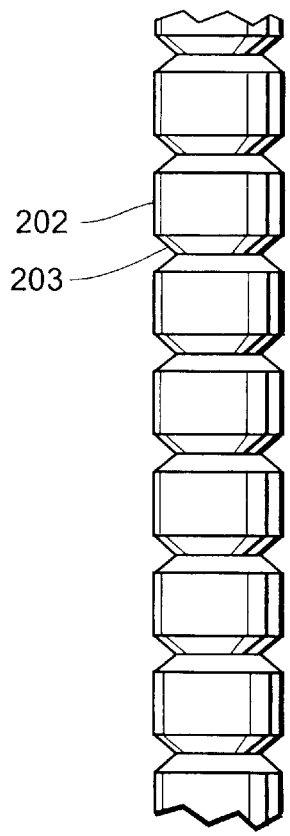
FIG. 6 depicts another embodiment of a portion of a bar for use with the invention.
Figure 7:
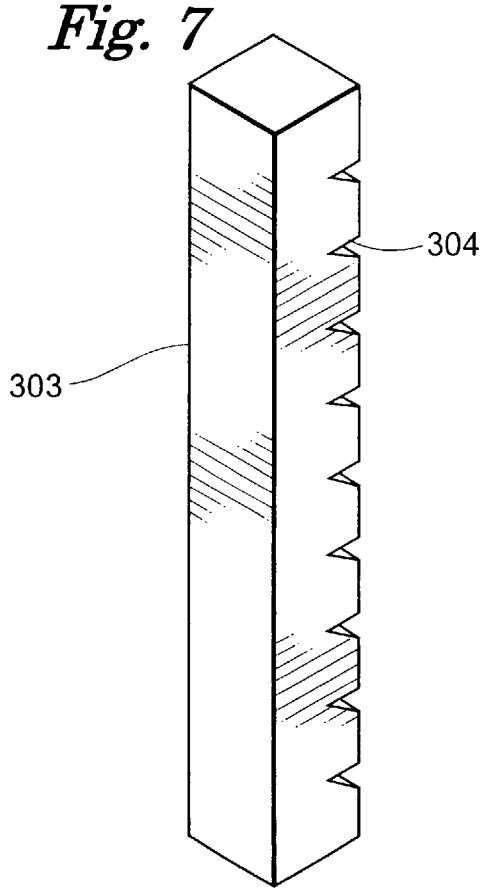
FIG. 7 depicts a perspective view of another embodiment of a bar of the invention.

FIGS. 6 and 7 depict alternative embodiments of the bar of the invention. The bar is lined with indents, for example, grooves, notches, invaginations, or other irregular contours that create a narrowed portion of the bar. As an example, bar 202 has grooves 203 spaced along its length. The grooves interface with opening 108 on bias portion 107 to secure holder 106. In the resting position, an edge of opening 108 in biased member 107 is at least partially forced into a groove 203 so holder 106 may not move along bar 102 while biased member 107 is in a resting position. Alternatively, a notch 304 may be used in bar 303 to secure holder 106. Alternatively, a protrusion that projects beyond the diameter of bar 102, 202, 303 may be used, for example, a ring, band, hump, bump, knob, button, bulge, or other protrusion that creates a thickened portion of the bar (not shown). Such protrusions pass through opening 108 when it is in a moving position but engage the biased member when the biased member is in the resting position to prevent movement of the holder. The present invention also includes embodiments that involve the use of other protrusions or indents that are obvious to those skilled in these arts after reading this disclosure.

Figure 8:
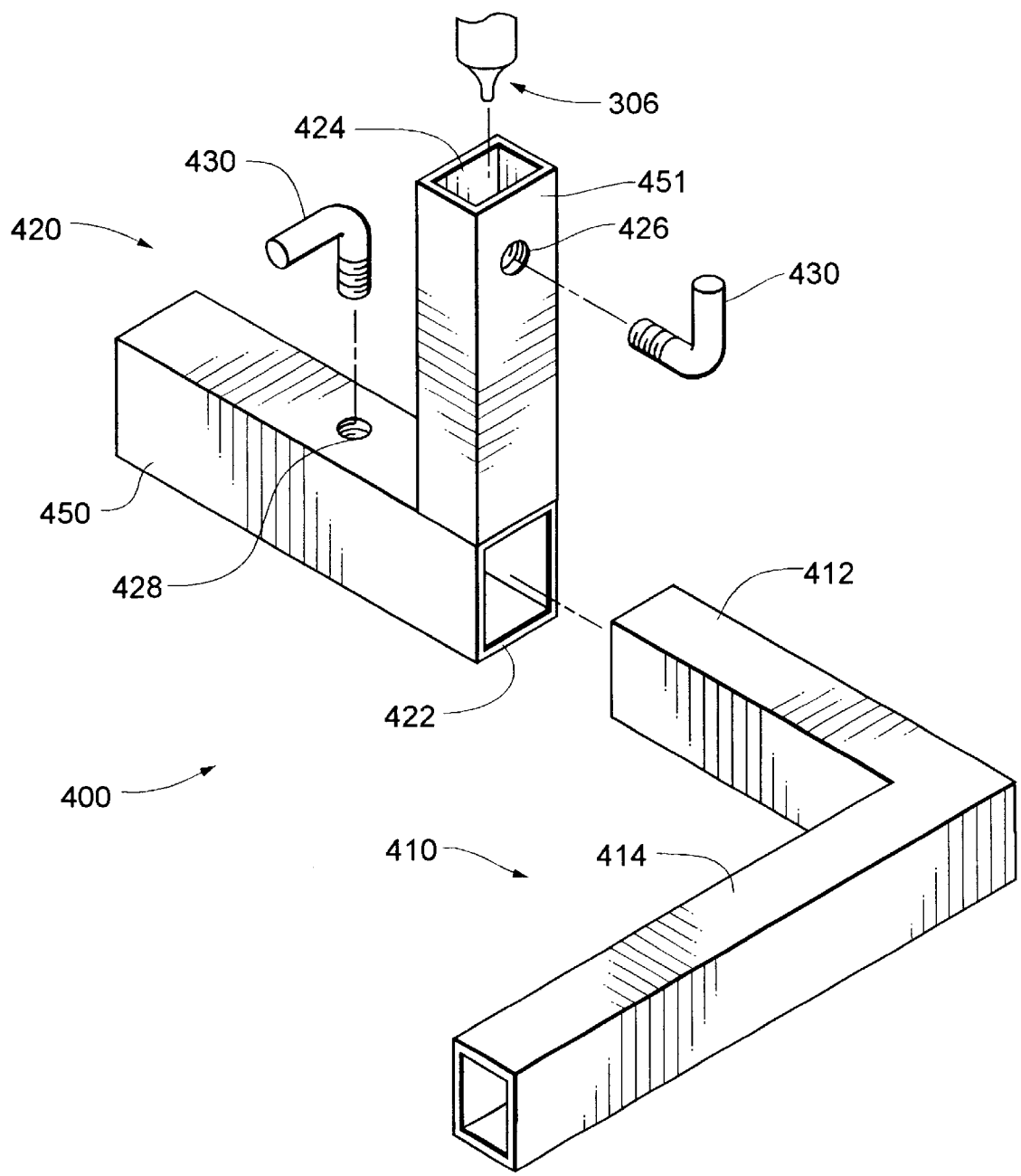
FIG. 8 depicts a perspective partial view of an embodiment of the invention that incorporates a stand.

Referring to FIG. 8, a stand may optionally be incorporated into the cooker. Stand 400 has two reversibly joinable stand members 410, 420. Stand member 410 has joining portion 412 that fastens to stabilizing portion 414 at approximately a right angle. Stabilizing portion 414 may be a hollow tube or rod of about three feet in length and a square cross-section of about 0.75×0.75 inches. Joining portion 412 is a tube or rod of about six inches in length with an outer cross-section dimensioned slightly smaller than 0.75×0.75 inches. Stand member 420 is made of horizontal portion 450 and vertical portion 451 which are hollow tubes or rods of square cross-section of about 0.75×0.75 inches joined at approximately a right angle. Horizontal portion 450 is about three feet long and vertical portion 451 is about five inches long. The lengths and widths of the various members and portions are provided for exemplary purposes and may readily be changed. Moreover, solid rods may be used instead of hollow rods, as well as other variations that will be obvious to one skilled in the art after reading this specification. Horizontal portion 450 and vertical portion 451 have threaded openings 428, 426, respectively for receiving threaded fasteners 430. Vertical portion 451 has opening 424 for receiving bar 306. Horizontal portion 450 has opening 422 for receiving joining portion 412 of stand member 410.

In use, stand members 410, 420 are joined by fitting joining portion 412 into opening 422, bar 306 is set into vertical portion opening 424 of stand member 420, and fasteners 430 are tightened. The assembled stand 400 thus has three mutually approximately perpendicular members, i.e., members that are approximately parallel to each of the x, y, and z-axes of a three dimensional Cartesian coordinate system; for example, horizontal portion 450 is parallel to the x-axis, stabilizing portion 414 is parallel to the y-axis, and vertical portion 451 is parallel to the z-axis. This disposition imparts stability to the stand for receiving the bar and holding the weight of food on the arm.

Certain embodiments of the grill may include: a griddle, a spit, a flat cooking surface positionable on the arm, a flat surface for supporting an object for heating, a flat surface bounded by sides so that water poured onto the surface would be prevented from flowing off the surface by the sides, a pot, a pan, a container, and a corrugated flat surface. Alternatively, other cooking aids may be attached to the arm instead of a grill. Such aids include, for example, a hook, hoist, clasp, or devices for attaching an item to be used near a fire. For example, a pot with a handle could be suspended from a hook attached to the arm.

Certain embodiments for fasteners, for example, for fastening the grill to the arm or portions 412, 414 to each other include: bolts, nuts, screws, snaps, rivets, pins, cotter pins, collets, detents, friction fits, biased members for fitting into an opening, tenons, mortises, hooks, latches, and clamps. The fastener(s) preferably allow rotation of the grill relative to the arm.

Other embodiments of the bar, arm, and stand include at least one joint. The joint(s) may allow movement up-and-down, side-to-side, or in all directions relative to the ground when the cooker is assembled. The arm and/or bar may be made of one continuous portion or several separable portions reversibly joined together to form the arm. Telescoping and/or retractable arm and/or bars may be used. The arm and/or bar or a portion thereof may also be allowed to rotate about a longitudinal axis, for example, to allow twisting of an arm relative to the bar. Multiple arms and/or bars may also be employed: for example, several. arms may be attached to one bar.

The bar, arm, holder, stand, and fasteners are preferably heat and fire resistant and are made of metal, more preferably of steel alloy, although aluminum and other alloys are suitable. High temperature composites are also contemplated in certain embodiments of the invention. Metals preferably are coated with paint to prevent corrosion. The grill is preferably a steel alloy with a nickel-plated finish. Alternatively, plastics may be used, particularly for the bar, stand, and holder. Plastics include polyethylene, polycarbonate, polyvinylchloride, polyfluorocarbons, polyurethane, polypropylene, and polystyrene.

The bar and stand are preferably cylindrical and the arm is preferably rectangular in cross-section. Other shapes are suitable, however, for example, shapes that have a cross-section of a: circle, triangle, square, polygon, or ellipse, as well as those variations of these shapes that may be depicted using curved lines instead of straight edges. Certain embodiments include hooks for hanging items. The hooks are preferably placed on the arm in a portion of the arm that is between the bar and the end of the arm that is most distant from the fire when the cooking apparatus is in use. Alternatively, other fasteners may be used besides hooks, including: snaps, hook-and-loop material, rods, clips, loops, and eyes. The arm preferably also has a handle on a portion of the arm near the end of the arm that is farthest from the fire when the cooking apparatus is in use. The handle preferably is fixedly attached to the arm and projects upwards relative to the ground when the cooker is assembled. Alternatively, the handle may be reversibly affixed to the arm. The handle is preferably metallic. Alternatively, the handle may be other materials, e.g., plastic. Furthermore, the handle may be attached directly to the arm, for example, as a plastic grip that is fitted over a portion of the arm.

The foot stop is preferably a metal rod that has been spot-welded to the bar at approximately a perpendicular angle. Alternatively, the foot stop may have any of a wide variety of shapes known to those skilled in these arts as being suitable for transmitting force to the bar for driving the bar into the ground. For example, a spade-shaped profile may be used.

A kit for assembling a cooker is also contemplated. The cooker may be, for example, the cooker set forth in FIGS. 1–5 or another embodiment of the invention described herein. The kit contains a grill, a bar, a holder, and an arm. A footrest is preferably included. The kit may also include a stand and instructions. The kit is preferably assembled in a package, preferably in one box, although more than one package may be used. The kit preferably contains instructions for assembly of the cooker from the kit. The instructions may be pictorial, for example a picture on the outside of the package, or set forth in words. The instructions may be set forth on paper or provided in another suitable format, e.g., a computer display, magnetic media, compact disc, and computer-readable media.

The holder is preferably made by a metal stamping process. Those skilled in these arts will appreciate the techniques required to make the present invention after reading this disclosure.

Certain embodiments of the invention have been described in detail. These embodiments are not intended to limit the scope of the invention. Instead, persons skilled in these arts will recognize additional embodiments of the invention after reading this disclosure.

What is claimed is:

1. An apparatus for cooking over a fire, the apparatus comprising:
   a bar having a central axis passing through a first end and an opposing second end, and a holder operably associated with the bar and an arm; the holder including a biased member operably coupled to the holder and being shiftable between a resting position and a moving position, with the biased member having an opening that receives the bar and a second opening that receives the arm, the biased member exerting a bias against the bar for binding the bar in the resting position to prevent movement of the bar parallel to the central axis, the biased member allowing movement of the arm in a direction parallel to the central axis when the bias is countered to shift the biased member to the moving position.

2. The apparatus of claim 1 wherein the opening in the biased member is oriented approximately perpendicular to the second opening when the biased member is in the moving position.

3. The apparatus of claim 2 wherein the arm further comprises an opening that receives the bar and is approximately concentric with the opening in the biased member when the biased member is in the moving position.

4. The apparatus of claim 1 further comprising a stand.

5. The apparatus of claim 4 wherein the stand comprises a first and a second reversibly joinable portion that define three mutually approximately perpendicular members when joined.

6. The apparatus of claim 5 wherein each reversibly joinable portion comprises two subportions joined to each other at approximately a right angle.

7. The apparatus of claim 6 wherein one of the subportions of the first reversibly joinable portion fits within an opening in one of the subportions of the second reversibly joinable member to define the three mutually approximately perpendicular members.

8. The apparatus of claim 1 wherein the bar comprises an indent that engages the biased member to prevent the movement of the holder along the bar when the biased member is in the resting position.

9. The apparatus of claim 1 wherein the bar comprises a protrusion that passes the holder in the moving position and engages the biased member to prevent movement of the holder when the holder is in the resting position.

10. The apparatus of claim 1 further comprising a grill attached to the arm.

11. The apparatus of claim 10 further comprising hooks and a handle attached to the arm.

12. A kit for a cooking apparatus comprising:
   a bar having a central axis passing through a first end and an opposing second end, and a holder that may be joined to the bar and to an arm, the holder including a biased member operably joined to the holder that is shiftable between a resting position and a moving position, with the biased member having an opening for receiving the bar and a second opening for receiving the arm, the biased member being disposable on the bar to exert a bias against the bar for binding the bar in the resting position to prevent movement of the arm parallel to the central axis, the biased member being disposable on the bar to allow movement of the bar in a direction parallel to the central axis when the bias is countered to shift the biased member to the moving position, with the kit further comprising instructions for assembly of the bar, the arm, and the holder.

13. The apparatus of claim 12 wherein the opening in the biased member is approximately perpendicular to the second opening when the biased member is in the moving position.

14. A kit for a cooking apparatus comprising:
   a bar having a central axis passing through a first end and an opposing second end, and a holder that may be joined to the bar and to an arm, the holder including a biased member operably joined to the holder that is shiftable between a resting position and a moving position, with the biased member having an opening for receiving the bar, the biased member being disposable on the bar to exert a bias against the bar for binding the bar in the resting position to prevent movement of the arm parallel to the central axis, the biased member being disposable on the bar to allow movement of the bar in a direction parallel to the central axis when the bias is countered to shift the biased member to the moving position, with the kit further comprising instructions for assembly of the bar, the arm, and the holder, wherein the arm further comprises an opening that receives the bar and is approximately concentric with the opening in the biased member when the biased member is in the moving position.

15. The kit of claim 12 further comprising a stand.

16. A method for assembling a cooking apparatus, the method comprising:

providing a bar having a central axis passing through a first end and an opposing second end, an arm, and a holder including a biased member operably coupled to the holder and being shiftable between a resting position and a moving position with the biased member having a first opening that receives the bar and a second opening that receives the arm;

passing the bar through an opening in the arm so that the bar and the arm are approximately perpendicular;

passing the arm through the second opening in the holder;

passing the bar through the first opening in the holder with the biased member in the moving position; and returning the biased member to the resting position wherein the biased member exerts a bias against the bar to prevent movement of the arm parallel to the central axis.

17. The method of claim 16 wherein the opening in the biased member is approximately perpendicular to the second opening when the biased member is in the moving position.

18. The method of claim 16 further comprising attaching the bar to a stand that has three mutually perpendicular members.

19. The method of claim 18 further comprising assembling the stand from two reversibly joinable members.

20. The method of claim 16 further comprising attaching a grill to the arm.

* * * * *